Nov. 6, 1962      I. J. NOVAK      3,062,697
METHOD OF MAKING REINFORCED PLASTICS
Filed Jan. 2, 1959
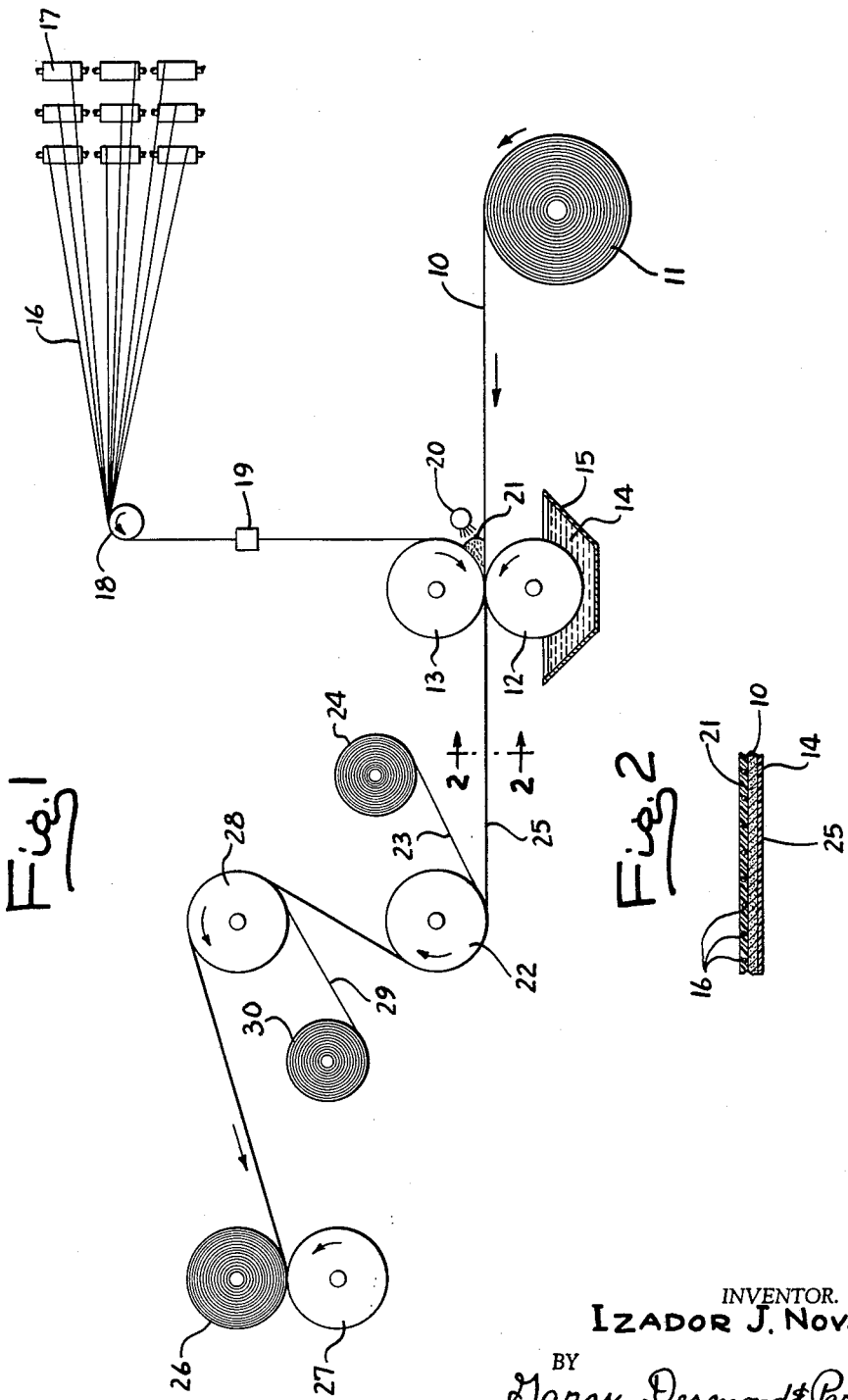
INVENTOR.
IZADOR J. NOVAK
BY Garry, Desmond & Parker
ATTYS.

3,062,697
METHOD OF MAKING REINFORCED PLASTICS
Izador J. Novak, Trumbull, Conn., assignor to Raybestos-Manhattan, Inc., Passaic, N.J., a corporation of New Jersey
Filed Jan. 2, 1959, Ser. No. 784,563
2 Claims. (Cl. 156—178)

This invention relates to the production of novel reinforced plastic compositions, in sheet form of varying widths, including tapes, ready for laminating, and the production of laminates therefrom of flat, angular and curvilinear objects of enhanced strength and durability.

More specifically, the present invention relates to the production of composite sheet material composed of a felted fibrous base sheet having disposed on one face thereof a plurality of unwoven, substantially uniformly and closely spaced parallel strands of glass fiber, said base sheet being impregnated and coated with solidified thermosetting resin and the glass strands being embedded in the resin coating on one face of the base sheet.

The present invention further relates to the production of laminates from a plurality of plies of the aforesaid composite sheet material to result in a substantially homogeneous structure, wherein the resin is thermoset and merged to a continuous phase or body of fiber-filled resin, with the glass fiber strands bonded within the resin-fiber matrix in their originally spaced parallel relationship, except insofar as the composite may be molded to other than planar shape.

A particular object of the present invention is to obtain improved physical properties by providing laminatable composite sheet material of such character that laminates produced therefrom will be substantially void-free.

The obtaining of my void-free laminates is accomplished, in accordance with the present invention, by the employment of hot melt thermosetting resins and the impregnation and coating of the felted fiber base sheet carrying the fiberglass strands, with said resin, in a manner whereby the fiberglass strands are embedded in the resin and the resulting composite molded while cooling to the solid or semisolid state and to a condition wherein the opposed surfaces of the composite are planar and in plane-parallel relationship.

By employing hot melt thermosetting resins the tendency of the felted fibers or paper layer to unduly swell, as compared to the employment of solvent solutions of resin, is markedly reduced. Further, as distinguished from the employment of solvent solutions of resins which shrink down largely during drying and leave voids in the previously swollen felted structure, hot melt saturation leaves the saturant filling the spaces between the strands of glass fibers as they lie on the paper base sheet and also the pores of the paper base. When the solvent-free hot melt resins solidify on cooling they continue to fill the space, and since the hot melt resins here employed do not emit any gases or form any volatilizable products during curing to thermoset condition, no voids are produced as a result of the resin cure nor is there entrapped moisture or other volatiles.

Filling and leveling of the resin on the overlaid fiberglass strands, in the manner hereinafter described, provides a product practically solid in cross-section in sheet form which reduces entrapment of air to a minimum when the layers are laminated, as for example by winding them in the form of a tube on a mandrel or pressing in a flat laminate. This means that the difficulties involved in obtaining a solid structure laminate are greatly reduced, and as evidenced by the high compactness and high strength of laminates made in accordance with the present invention.

The aforesaid composite reinforced plastic sheet material is particularly adapted for the production of wound or wrapped structures such as tubes, pipes, ducts, and the like, either by straight winding of wide sheets or by spiral winding of tapes produced therefrom. Beams of U, T, L, and H construction can also be formed in suitable molds, as well as flat, cupped, dished or other curved shapes.

It must be noted that even with the described structure which is highly adapted to produce laminates with minimum voids, if the layers are carelessly or distortedly placed together before laminating, air and voids will be produced which will remain in the final hardened laminate. It is thus desirable that ply contacting means be used which do not entrap air at this process step.

Among other objects and advantages of the present invention are the positioning of the fiber-glass strands under uniform tension during disposing of them on the felted fiber base sheet, preferably in a single layer of side-to-side disposed yarns, and the envelopment of the glass strands in resin in a manner whereby they will maintain their desirable uniformly-spaced, parallel-oriented relationship, and thus result in the production of a composite which will permit uniform stress distribution and produce sections of uniformly high density.

The present invention, together with further objects and advantages thereof, will be apparent from the following description and the accompanying diagrammatic drawings, wherein:

FIG. 1 is a diagrammatic side elevational view of an arrangement of apparatus for carrying out the process of the present invention.

FIG. 2 is a fragmentary enlarged diagrammatic section on the line 2—2 of FIG. 1 showing a transverse section of my reinforced composition sheet material.

Thus, referring to FIG. 1 of the drawings, a web of felted fiber sheet material 10 is continuously drawn from the roll 11 to pass between the oppositely rotating rolls 12 and 13 where the sheet becomes impregnated, and coated on one face with hot melt resin from the body 14 contained in the receptacle 15 wherein the roller 12 dips. At the same time a plurality of fiberglass strands of yarn 16, from the bobbins 17, are fed over the roll 18 and then vertically downwardly under tension to and around roll 13. Roll 18 is so disposed in relation to and between the yarn supply 17 and roll 13 as to cause the fiberglass strands to be held by tension and wrapped around a considerable portion of the periphery of the roll 13 before coming into contact with the web 10 and impregnating solution 20. This prevents random side slipping of the side-by-side-positioned strands of yarn, maintains even distribution, and prevents overlap of the strands as they come in contact with the saturant. The reed 19, disposed near the point of application of the strands of yarn, maintains the spacing in parallelism of the separate strands, all of which insures even side-by-side yarn distribution in a plane, and high density in the ultimate laminate. Uneven and overlapped yarn bundles obviously tend to produce voids and prevent uniform ply contact. As the strands of yarn are brought into contact with the forwardly moving paper base 10, a supply of hot resin is further provided from the tube 20, extending parallel in substantial equal extent to the roll 13, so that a pool of resin is provided as at 21 to insure impregnation and coating of the sheet 10 and the filling of the spaces between and coating and saturating the strands of fiberglass 16.

The glass filaments of the strands 16 are of conventional character, such as 204 filaments per strand, and may carry conventional finishes to provide for enhanced affinity with the resin impregnants.

As the resin impregnated and coated composite passes away from the rolls 12, 13, it cools and the resin begins to thicken, and while in still malleable condition, it is trained about the roll 22, at which time a sheet of smooth material such as polyethylene, polyester or the like 23 from the roll 24 is fed between the roll 22 and the now composite sheet 25, before being wound up on the roll 26 by the drive roll 27. This results in a molding of the resin on the fibers 16 in a smooth planar or continuous surface, and if desired, as further shown in the drawing, a similar molding operation may be carried out with respect to the opposed face of the sheet and the resin coating thereon by passing it around roll 28, at which time another similar layer of smooth material 29 is fed from the supply roll 30.

Although the diagrammatic drawing shows a relatively small number of bobbins 17, it will be understood that any desired number of fiberglass strands may be employed and laid on in parallel, an average number of about 100 strands per inch of width giving excellent strength, such as high tensile and hoop strength in tubes. The yarn supply may also be in the form of beams of yarn, each carrying a large number of ends of the yarn.

FIG. 2 illustrates the plane parallel surfaces of the composite 25, the impregnation and coating of the paper base 10 so that there is desirably a resin coat 14 on one face, with a relatively thicker coating or layer of resin 21 on the opposed face enveloping and coating the spaced glass fiber strands 16.

The felted fibrous base sheet 10 is desirably composed of fibrous asbestos but may include conventional amounts of cellulose fiber as a felting aid, mineral fillers, or other fibers such as chopped strand glass yarn. Further, the sheet material may be wet-felted in accordance with conventional paper-making processes, or may be dry-felted as by carding. As is conventional with sheet material for laminating, the base sheets should be of an absorbent character, and suitably relatively thin. Thus, for example, a sheet eminently suited for this felted fiber paper base is of about 3-mil thickness and composed of the dried residue of a colloidal dispersion of asbestos fibers known as Novabestos, in accordance with my United States Patent 2,626,213. Another example of suitable material is a sheet composed of asbestos fibers of the aforesaid character in combination with chopped glass strands as set forth in U.S. Patent No. 2,772,157. Other papers, such as composites of short fibrous asbestos material and mineral fillers in thin sheet form known as Quinterra are also satisfactory. Also useful are sheets of conventional water-laid asbestos, or sheets of carded asbestos known as Pyrotex.

The resin impregnants as hereinbefore indicated and employed in accordance with the present invention are those which are normally solid or semisolid at room temperature and which can be liquefied to a saturating viscosity of the order of 5 poises, more or less, by heating at temperatures of above about 120° F., and which on laminating can be thermoset to infusible condition. Further, the hot melt resins employed in the present invention are those which are solvent and moisture free and which do not give off reaction products in quantity as, for example, water, which might leave voids by evaporation or result in weak spots by entrapment. Particularly suitable for such purpose are epoxy resins which are commercially available in normally liquid and solid forms, and also such resins as thermosetting polyesters, allyls, and others well known in the art.

An example of suitable resin for use in accordance with the present invention is a mixture of a solid epoxy resin (Shell's Epon 1001) and a liquid epoxy resin (Shell's Epon 828) in proportions of 20:80 to 60:40, with a preferred proportion of 40:60 which results in a desirable saturating viscosity when heated to about 200° F.–230° F. in admixture with a conventional copolymerizing hardening agent, a preferred one being phthalic anhydride used in proportions of 40 to 60% by weight of the epoxy resin. Other useful hardening agents are chlorendic anhydride, methyl nadic anhydride, chloromaleic anhydride, and others, as well as slow-acting amines such as 4,4 diamino diphenol sulfone, and the like. These and similar hardeners may be employed as long as their cure rate is slow enough at the hot melt temperature for adequate potlife and so that they thereafter thermoset satisfactorily in the final laminate. The epoxy resins satisfactory for the practice of the present invention are the conventional condensation products of epichlorohydrin and bisphenol in the presence of caustic. By using an excess of epichlorohydrin, the lower molecular weight liquid polymers are formed, and with higher proportions of bisphenol higher molecular solid resins result. The commercial resins, employed herein, are mixtures of polymers, the major component of the resin being the glycidyl ethers of polyhydric phenols such as bisphenol-A, and epichlorohydrin. Although the aforesaid epoxy resins have been found particularly suitable, others are epoxy resins formed by the treatment of olefins with peroxides, such as with peracetic acid. Also the epoxy resins of the class of dicyclo diepoxy carboxylate, now available as Union Carbide Epoxy Resin 201, and the like.

In carrying out the process of the present invention and in order to maintain the resin in liquid condition, the rolls 12 and 13 may be heated as by steam or hot water in conventional manner, and similarly the rolls 22 and 28 may be cooled with water or the like for the purpose of cooling the resin in the composite web 25 after leveling or molding the surfaces.

The moderately high viscosity of the hot melt resin in molten condition, plus its further increase in viscosity due to cooling and solidifying very soon after application, reduces the swelling of the paper base component 10 and leaves a thin layer of resin on the paper surface, it being understood that the illustration of FIG. 2 is highly enlarged and diagrammatic.

The effect of placing the smooth films, such as of polyethylene, 23, 29 between the freshly treated, still soft sheet composed of paper, resin and strands of glass fibers, and the cool draw rolls 22 and 28 while the sheet is under tension, is to form a smooth, resin-filled surface on each side of the composite as the resin hardens by cooling. This smooth resin-filled surface is ideal for making even contact between plies and for reducing any tendency to trap air between plies which might otherwise occur when relatively rough or uneven surface sheets are laid together. In the present invention, good adhesion between plies is enhanced by reason of the smooth resin-filled surface provided herein.

After the composite sheet with its smoothening overlay sheet or sheets has been wound up in the final roll 26, it is ready for use or may be stored for subsequent use. If the cooled resin viscosity is too low to hold the glass yarns down safely, it may be desirable to allow the composite roll to age until there is sufficient advancement of the resin to develop the necessary firmness for safe handling of the composite sheet minus the separator film. This is the case where, for example, a mixture of Epon 828 and methyl nadic anhydride in equal proportions is the saturant, both ingredients being liquid. In making tubes, the relatively wide sheets economically produced are slit into tapes of various widths for spiral winding, and for other flat or curved laminates other widths may be cut from the roll material.

The composite sheet material 25 is impregnated, filled, and coated with from about 35 to as high as about 65% by weight of the resin solids. Because of the reduction of swelling (as distinguished from the use of solvent solutions in resin) I find that a 50% resin content by weight is now the equivalent of previous 55–58% resin content in facility of bonding at low temperatures. At the same time there is no reduction of physical properties, and the tests demonstrate that uniformly good tubes can be made by using the rolling mandrel cure system, which involves very low pressure for ply bonding, so that with such low substantially contact or about 50 pounds per square inch pressure, specific gravities of 1.6 to 1.8 in laminates are obtained, representing over 90% of ultimate density.

The resins employed herein may be laminated at low pressure such as is sometimes designated contact pressure, and subjected to cure at temperatures of for example 150° F. for 12–18 hours, or at 300° F. for 30 to 60 minutes, depending on the particular resin, in tubes having a wall thickness of ⅛ inch. Other conventional laminating means can be employed, such as vacuum bag, air bag, or other light pressure methods for consolidating the plies of my impregnated composite plastic sheet material.

Thus, using the 40:60 combination of Epon 1001 and Epon 828 plus 60% phthalic anhydride based on the weight of the resins, I found that this became liquid and clear at 95° C. and was fluid enough at 120° C. to quickly saturate a dispersed asbestos paper 3½ mils thick. Its potlife at 120° C. is over 1 hour before it becomes too viscous to saturate, which is adequate for safe handling. Since the saturating tray 15 is of low capacity and new resin is fed in continuously, from a source not shown, as it is removed by the treated material, there is no difficulty with resin becoming stagnant and building excessive viscosity. When cooled to room temperature this mixture has a lardlike viscosity, and is amber colored and opaque.

In the apparatus shown, a 3½ mil asbestos paper sheet was fed into the saturating zone ahead of the heated rolls 12 and 13 and at the same time a warp of glass yarns was fed through a 50 dent per inch reed 19, 2 ends per dent, 100 ends per inch of width, both layers coming together at the same time and being saturated and coated with the hot resin above described. As soon as this composite left the heated zone it began to cool and could be seen to change color from a dark transparent condition to a light opaque appearance as it cooled in the distance between rolls 12 and 13 and roll 22. The polyethylene separator sheets (1½-inch thick) were applied on the rolls 22 and 28 to smooth the composite and prevent its adherence to the rolls or to itself and it was then wound into a firm roll 26. On standing the resin stiffened still further, and it was ready for use in 24 hours. The polyethylene was easily stripped from the composite and laminates could be prepared therefrom without trouble in handling, such as excessive tackiness or looseness of the attached yarns. The thickness of the composite was about 9 mils at 50% resin content, and after laminating and curing at 50 p.s.i., the ply thickness was about 8 mils. The density of the laminate was 1.65, over 90% of theoretical density.

The rolls of composite and polyethylene could be stored at 35–40° F. for 4 to 6 months before the resin lost its flow and the product was too far advanced for low pressure laminating. The preferred resin content varied from about 48% to 55%, depending on the amount of flow desired in the laminating process.

I claim:

1. The method of making reinforced composite plastic sheet material adapted for the production of novel laminates, which comprises impregnating and coating a felted fibrous web with hot melt thermosetting resin in molten condition while passing it forwardly between a pair of oppositely rotating surfaces, simultaneously drawing from tensioned engagement about the upper one of said rotating surfaces and disposing on said web and within the coating of molten resin on its upper surface, a plurality of unwoven, uniformly and closely spaced parallel fiberglass strands coextensive with and oriented in the direction of said forwardly moving base sheet, permitting the resin to cool and partially solidify while moving forwardly, and drawing the upper surface of said forwardly moving composite sheet while the resin content thereof is still in a malleable condition, about a cold rotating surface with a smooth surfaced interlayer interposed therebetween whereby to mold the upper surface of said sheet to and solidify it in planar condition.

2. The method of making reinforced composite plastic sheet material adapted for the production of novel laminates, which comprises impregnating and coating a felted web characterized by asbestos fiber content with hot melt thermosetting epoxy resin in molten condition while passing it forwardly between a pair of oppositely rotating surfaces, simultaneously disposing on said web and within the coating of molten resin on its upper face, and from tensioned engagement with the upper one of said rotating surfaces, a plurality of unwoven, uniformly and closely spaced parallel fiberglass strands coextensive with and oriented in the direction of said forwardly moving base sheet, permitting the resin to cool and partially solidify while moving forwardly, and sequentially drawing the upper and lower surfaces of said forwardly moving composite sheet while the resin content thereof is still in a malleable condition, about cold rotating surfaces with a smooth surfaced interlayer interposed therebetween whereby to mold the surfaces of said sheet to and solidify them in planar condition.

References Cited in the file of this patent

UNITED STATES PATENTS

| | | |
|---|---|---|
| 2,680,272 | Radtke | June 8, 1954 |
| 2,771,387 | Kleist et al. | Nov. 20, 1956 |
| 2,803,576 | Donaldson | Aug. 20, 1957 |
| 2,862,524 | Smith | Dec. 2, 1958 |

FOREIGN PATENTS

| | | |
|---|---|---|
| 205,327 | Australia | Jan. 7, 1957 |